United States Patent [19]

Gires et al.

[11] 3,764,928

[45] Oct. 9, 1973

[54] METHODS AND DEVICES FOR AMPLIFYING ELASTIC WAVES

[75] Inventors: François Gires; Charles Maerfeld; Pierre Tournois, all of Paris, France

[73] Assignee: Thomson-CSF, Paris, France

[22] Filed: Sept. 8, 1972

[21] Appl. No.: 287,367

[30] Foreign Application Priority Data

Sept. 10, 1971 France .............................. 7132717

[52] U.S. Cl. .................................. 330/5.5, 330/12
[51] Int. Cl. .............................................. H03f 3/04
[58] Field of Search ..................................... 330/5.5

[56] References Cited

UNITED STATES PATENTS 3,717,819 2/1973 Adler .................................. 330/5.5

*Primary Examiner*—Roy Lake
*Assistant Examiner*—Darwin R. Hostetter
*Attorney*—Roland Polottel

[57] ABSTRACT

Method and device for amplifying elastic waves by the interaction of these waves with a charge carrier wave of lower speed.

The method consists in placing in the path of the charge carrier wave facilities for generating periodic disturbances, so as to render periodic the interaction between charge carrier wave and elastic wave, thereby giving rise to space harmonics. By using a space harmonic corresponding to a carrier wave with a speed lower than that of the elastic wave, the value of the electric field needed to propel the charge carriers is considerably reduced.

9 Claims, 4 Drawing Figures

METHODS AND DEVICES FOR AMPLIFYING ELASTIC WAVES

Figure 1:
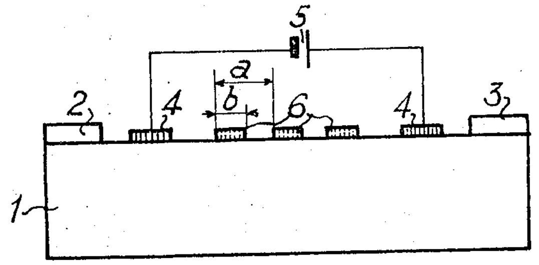

The present invention relates to improvements in the methods and devices for amplifying elastic waves. It deals in particular with a method of amplification and devices for putting it into effect, in which the periodic interaction of the elastic waves with a majority carrier wave being propagated at a speed lower than that of the elastic waves produces a given amplification for which the required electric field is of reduced value in relation to standard values.

In a majority of known elastic waves devices, amplification is obtained when these elastic waves interact with a charge carrier wave travelling in the same direction and at a speed in excess of that of the leastic waves. In the reverse case, the elastic waves are attenuated. The travelling speed $v_d$ of the charge carriers depends on both the mobility of the surroundings in which they move and the electric field E which drives the carriers. Thus, for example, the electric field E needed to amplify a surface acoustic wave at 100 MHz is of the order of 400 to 2,000 volts/cm according to the mobility value. When the length of the required interaction zone is considerable, the value of this field becomes very considerable also and gives rise to problems of construction and use.

One of the objects of the present invention is to overcome this disadvantage by making it possible to use charge carrier waves whose speed is lower than that of the elastic wave with a view to amplifying the latter. According to the invention, this is achieved by making the interaction between the elastic wave and the charge carrier wave discontinuous, for instance by arranging in the path of the charge carrier wave facilities for generating periodic disturbances so as to render this interaction periodic.

According to the present invention, a method of amplifying elastic waves by interaction with a charge carrier wave generated by a propelling electric field has as it principal characteristic the fact that said interaction is made periodically discontinuous by arranging in the path of the carrier waves generators of local periodic electrical disturbances, thereby creating space harmonics of desired degree and the same frequency, the given amplification being produced, with an electric field of reduced value, by utilising the action of a space harmonic corresponding to a charge carrier wave whose speed is less than that of the elastic wave.

In order to put the method into effect, the invention stipulates that a device for amplifying elas2ic waves, comprising a solid compressible medium which propagates elastic waves supplied by a source and which is provided with input and output transducers, a part of the propagation path being subjected to a charge carrier propelling electric field supplied by a continuous voltage source of adjustable value, has as its principal feature the fact that it includes, between electrodes applying said field and parallel to the wave surface of the charge carrier wave, conduction elements which generate periodic electrical disturbances and which are spaced at regular intervals and cross the path of said waves, the presence of said elements causing a periodic interaction between the carrier wave and elastic wave which gives rise to space harmonics of a desired speed of propagation, the existence of which permits a given amplification at a reduced voltage applied to said electrodes.

Other features and advantages of the present invention will appear from the following description which is given as a non-restrictive example and refers to the attached figures.

FIG. 1 : longitudinal section of an amplifying device according to the present invention.

Figure 2:
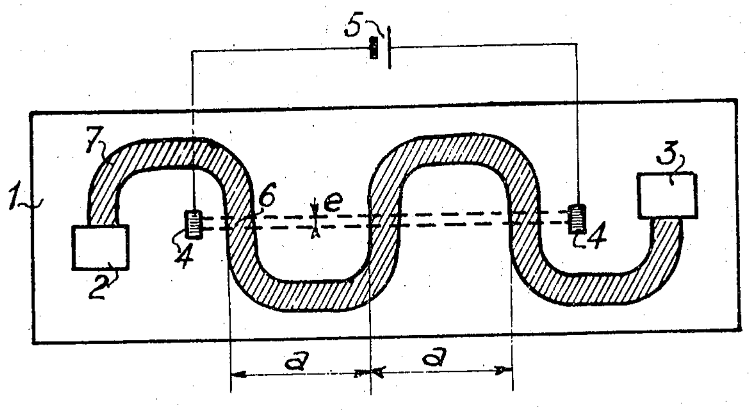

FIG. 2 : top view of a variation of the device according to the invention.

Figure 3:
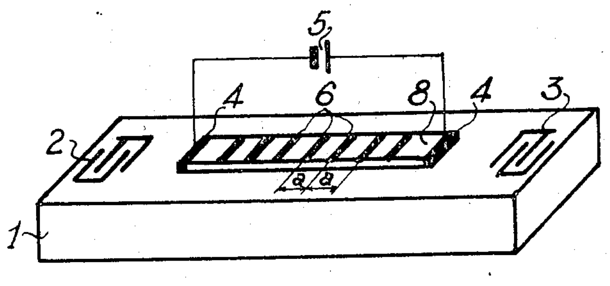

FIG. 3 : view in perspective of an ambodiment of the device according to the invention.

Figure 4:
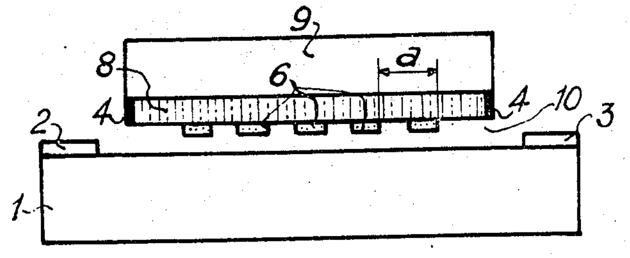

FIG. 4 : longitudinal section of another construction of the device according to the invention.

In these figures, the same elements are indicated by identical references.

The following description deals in particular with surface sound waves, but it may be assumed that this is not a limitation of the invention and that the method described may be applied in like manner to other kinds of elastic wave.

FIG. 1 shows a longitudinal section of an embodiment of a surface wave amplifier, consisting of an underlayer 1 in a piezoelectric and semiconductor material, one face of which is provided with transducers 2 and 3 which enable surface sound waves to be generated and picked up respectively and a pair of electrodes 4 linked to a source 5 of continuous voltage V which generates the electric field needed to propel the charge carriers. Between the electrodes 4 a charge carrier wave is propagated, whose interaction with the sound wave only causes the amplification of the latter when its direction of propagation is the same as that of the sound wave and its speed $v_d$ exceeds the speed $v_c$ of the sound wave. This unit corresponds to a prior art construction. According to the invention, these two conditions, namely direction of propagation and $v_d > v_a$, are no longer necessary if the periodic interaction between sound wave and charge carrier wave is made periodically discontinuous. To this end, as shown in FIG. 1, facilitaties for generating periodic electrical disturbances, termed "disturbances," for instance in the form of a network of conducting bands 6 parallel to the charge carrier wave surfaces and with a constant rate *a*, are arranged between electrodes 4, that is crossing the path of the charge carrier waves. The presence of these periodic "disturbances" 6 means that neither the sound wave nor the charge carrier wave can any longer be considered as pure plane waves, but as sums of plane waves whose respective numbers of waves $k_c$ and $k_d$ fulfil the following equations :

$$k_c = (2\pi f/v_c) + m(2\pi/z)$$

and $$k_d = (2\pi f/v_d) + n(2\pi/a)$$

in which $f$ is the wave frequency, $m$ and $n$ whole numbers, $v_c$ the propagation speed of the sound wave, $v_d$ the speed of movement of the charge carrier wave and $a$ the constant unit of the bands.

Thus, the space harmonics of these waves appear, which have the same frequency f but different speeds from those of the fundamental waves. The electronic gain of such a device is zero each time that there is $k_d = k_c$, i.e., $$2\pi f/v_d = (2\ \pi\ f/v_c) + p(2\ \pi/a)$$

$p$ being a whole number. As in standrad devices, there is amplification when $k_d$ is slightly less than $k_c$, but this can take place with charge carrier propelling speeds $v_d$ less than the speed $v_c$ of the sound wave, depending on the value of the whole number $p$, that is the degree of the space harmonic used in the interaction, for in the case there is the relation :

$$\frac{v_d}{v_c} = \frac{1}{1+p\frac{v_c}{af}} = \frac{1}{1+p\frac{\lambda c}{a}}$$

where $\lambda c$ is the wavelength of the sound wave.

The electronic gain of a standard amplifier as a function of the speed $v_d$ of the charge carrier wave has a zero passage for the synchronous speeds $v_d = v_c$ and a minimum and maximum on either side of this value. The electronic gain curve of this same amplifier modified according to the present invention has a sequence of points of inflection which can be zero passages for each value of $v_d = v_c/[1 + p(\lambda i\ c/a)$ corresponding to a different degree value $p$ and also maximum and minimum values on either side of these values.

The unit of electrical disturbances 6 is preferably less than or equal to $\lambda c/2$. If, for example, $a = \lambda c/2$ and $p = 1$, it is sufficient if the speed $v_d$ of the carriers is slightly in excess of $v_c/3$ for amplification to be noted, which corresponds to a reduction by a ratio of 3 of the carrier drive voltage $V$ needing to be applied to the elctrodes 4, i.e., an important effect aimed at by the invention. The width b of the disturbances 6 is chosen so as to eliminate the influence of other space harmonics. It is chosen, for example, equal to $a/2$ when $p = 1$. The thickness of these disturbances 6 is preferably very thin and less than $\lambda c/10$.

FIG. 2 shows a top view of a variation of the device in FIG. 1 according to the invention. In this device, the sound wave generated by the input transducer 2 on the surface of the underlayer 1 which is both piezoelectric and semiconductive is guided, following a known method, by a band 7 of a material in which the propagation speed is lower than that of the underlayer 1 and which consists, for example, of a deposit of gold band on the underlyaer 1, the band having an outline, for instance, of a line with periodic bands at a period of $2a$. Electrodes 4 supplied by a continuous voltage source 5 are arranged on the underlayer 1 so as to place in phase the sound wave and charge carrier wave at every intersection 6 of their paths. The width e of the charge carrier flux is preferably low as compared with $\lambda c$, so that in the interaction zone 6 the phase variation of the sound wave is as little as possible ; for the same reason, it is advisable if in this interaction zone the band 7 is parallel to the wave surfaces of the charge carrier wave. In such a construction, interaction between the two kinds of wave only occurs in sections 6 which are spaced at regular intervals $a$, as a result of which amplification is obtained in conditions akin to those described for the device in FIG. 1.

Other outlines for guiding the sound wave may be used in like manner, the essential point being that at the intersection of one outline with the path of the charge carriers the two waves must be in phase and these intersections periodic.

FIGS. 3 and 4 relate to standard amplifiers of the type with separate piezoelectric and semiconductor media, modified according to the invention. FIG. 3 shows in perpsective an amplifier in which the semiconductor material 8 is laid in a thin layer on the piezoelectric underlyaer 1 containing the transducers 2 and 3. The periodic electrical disturbances according to the invention, arranged between the electrodes 4, consist, for example, of a netowrk of conductive srips 6 made of aluminum or gold, for instance, preferably executed on theupper surface of the thin semiconductor layer 8 by a hpoto-engraving technique. It is well known that it is also photo-engraving technique. It is well known that it is also possible to execute this same type of construction by using a semiconductor underlayer on which a thin piezoelectric layer is laid.

FIG. 4 illustrates a known amplifying construction in which a thin layer of air, for example of the order of 500 A to 1,000 A, separates the piezoelectric underlayer 1 from the thin semiconductor layer 8 carried by an insulating underlayer 9. According to the invention, parallel conducting bands 6 are arranged on the surface of the thin layer 8 inside the layer of air 10, the crucial thickness of the latter being that which separates the bands 6 from the piezoelectric underlayer 1. The operation of this construction, as of that shown in FIG. 3, is similar to what has been described for FIG. 1.

The above description relates to a method and devices making it possible to diminish very considerably the continuous voltage needed, for a specific length of interaction zone, to amplify an elastic wave by means of charge carriers.

What I claim, is

1. Method of amplifying elastic waves by interaction with a charge carrier wave generated by a propelling electric field, wherein said interaction is made periodically discontinuous by arranging in the path of the carrier waves generators of local periodic electrical disturbances, thereby creating space harmonics of desired degree ($p$) and the same frequency ($f$), the given amplitude, with an electric field of reduced value, being produced by utilising the action of a space harmonic corresponding to a charge carrier wave whose speed ($v_d$) is less than the speed ($v_c$) of the elastic wave.

2. Device for amplifying elastic waves to put into effect the method according to claim 1, comprising a solid compressible medium for propagating elastic waves supplied by a source, which is provided with input and output transducers, a part of the propagation path being subjected to a charge carrier propelling electric field supplied by a continuous voltage source of adjustable value, wherein there are, between the electrodes (4) applying said field and parallel to the wave surface of the charge carrier wave, conductive elements (6) which generate periodic electrical disturbances, are spaced at regular intervals ($a$) and cross the path of said waves, the presence of said elements causing periodic interaction between carrier wave and elastic wave which given rise to space harmonics with a desired speed of propagation ($v_d$), the existence of which permits a given amplification for a reduced voltage applied to said electrodes(4).

3. Device for amplification according to claim 2, wherein (FIG. 1) a materiais used which is both piezoelectric and semiconductive and said conductive elements (6) are made up of a network of conducting bands distributed over the solid medium (1) at a constant rate ($a$), the value of which is the nearest to half the length ($\lambda c/2$) of the sound wave, the thickness of said band being very slight in comparison with said wave length ($\lambda c$) and its width being chosen to eliminate the influence of unused space harmonics of degree ($p$).

4. Device according to claim 3, wherein the selected degree of harmonic is $p = 1$, the constant unit is $a = \lambda c/2$, the width of band $b = a/2 = \lambda c/4$ and its thickness is less than $\lambda c/10$.

5. Device according to claim 2, wherein (FIG. 2) the piezoelectric and semiconductor underlayer (1) includes a conducting guide line (7), in which the propagation speed is less than that of the underlayer and which links the input and output transducers (2, 3) by periodically crossing the charge carrier wave path bounded by said electrodes (4), arranged on the underlayer, in such a way as to meet in phase sound wave and charge carrier wave at every point of intersection (6) of their paths, the width ($e$) of the charge carrier flux being small in relation to the wavelength ($\lambda c$) of the sound wave in order to reduce the phase variation of this wave at said points of intersection which constitute the place where the disturbance generating the periodic interaction is created.

6. Device according to claim 5, wherein said conducting line (7) is made up of a gold band laid on the underlayer (1), the contour of the band being in the form of a line with periodic bands of a period 2$a$ and the intersections being spaced by the rate $a$.

7. Device according to claim 2, wherein (FIG. 3) there is a piezoelectric material and a semiconductor material (1,8), one being laid in a thin layer on the other and provided with said electrodes (4), said periodic disturbances (6) being made up of a network of conducting strips which are spaced at equal intervals ($a$) and arranged on said thin layer (8).

8. Device according to claim 7, wherein said strips are of metal, aluminum or gold, executed on said thin layer (8) by a photo-engraving process, the transducers (2, 3) being of the interdigital type.

9. Device according to claim 2, wherein (FIG. 4) there is a piezoelectric underlayer (1) and an insulating underlayer (9) provided with a thin semiconductor layer (8) which is equipped with said electrodes (4) and separated by a layer of air (10) of a thickness within 500 and 1,000 A, said disturbances being created by parallel conducting bands (6) laid at equal intervals on the surface of said thin layer on the inside of said air layer whose crucial thickness depends on said bands.

* * * * *

UNITED STATES PATENT OFFICE
CERTIFICATE OF CORRECTION

Patent No. 3,764,928 Dated October 9, 1973

Inventor(s) Francois Gires; Charles Maerfeld; Pierre Tournois

It is certified that error appears in the above-identified patent and that said Letters Patent are hereby corrected as shown below:

Claim 3, Line 2, change

"materiais" to -- material is --

Signed and sealed this 12th day of February 1974.

(SEAL)
Attest:

EDWARD M. FLETCHER, JR.
Attesting Officer

C. MARSHALL DANN
Commissioner of Patents

'ORM PO-1050 (10-69)

USCOMM-DC 60376-P69
☆ U.S. GOVERNMENT PRINTING OFFICE : 1969 O—366-334.